United States Patent Office 3,424,858

Patented Jan. 28, 1969

3,424,858

LINE COMMUNICATIONS SYSTEM INCLUDING AN ELECTRIC AMPLIFIER COMPOSED OF SIMILAR TRANSISTORS

Hans Karl Pfyffer, Bern, Switzerland, and John Raymond Whitbread, Coventry, England, assignors to The General Electric Company Limited, London, England, a British company Filed Mar. 1, 1965, Ser. No. 436,104
Claims priority, application Great Britain, Feb. 28, 1964, 8,409/64
U.S. Cl. 179—170 6 Claims
Int. Cl. H04b 3/38, 3/58

ABSTRACT OF THE DISCLOSURE

In a telephone system in which a high voltage low current direct current supply is fed over the line from a terminal station for energizing repeater amplifiers connected in the line, a transistor repeater amplifier in which a plurality of similar transistors have their emitter-collector paths connected in series for direct current energization, so as to withstand the high voltage, and in parallel for alternating current signals so as to provide a suitable alternating current output impedance.

This invention relates to electric circuit arrangements. More particularly this invention relates to electric amplifier circuit arrangements employing transistors.

In certain applications of such circuit arrangements, such as in the repeater amplifiers of a line communication system in which the direct current to operate the amplifiers is supplied from a terminal station of the system by way of the transmission line, it is desirable, to minimise resistive losses in the transmission line, to operate the amplfiers from a high voltage/low current supply. However, the voltage limitations of existing transistors prevent their use in conventional circuit arrangements.

It is an object of the present invention to provide an electric circuit arrangement employing transistors which can be energised from a high voltage power supply source without overloading the transistors.

Thus, according to one aspect of the present invention, an electric circuit arrangement comprises a plurality of networks each including at least one transistor, the major current paths of which networks are connected in parallel as far as the transmission of an alternating current signal through the arrangement is concerned and are connected in series as far as the supply of direct current to operate the transistors is concerned.

According to another aspect of the present invention, an electric amplifier circuit arrangement comprises a plurality of similar transistors, each having a control electrode and first and second further electrodes, means connecting the current paths between the respective first and second further electrodes of said transistors in series in respect of direct current, means connecting the current paths between the respective control and first further electrodes of the transistors in parallel in respect of alternating current signals, means to supply an alternating current input signal in substantially the same phase to the control electrodes of all of the transistors, means to derive a single alternating current output signal from the second further electrodes of all of the transistors, and means to supply direct current to the series arrangement of first further electrode to second further electrode current paths, the arrangement being such that, during use, the voltages between the respective first and second further electrodes of the transistors are substantially equal.

Preferably said transistors are junction transistors, each having base, emitter and collector electrodes, said control electrode being the base electrode and said first and second further electrodes being the emitter and collector electrodes, respectively.

Said means to derive an output signal may include a transformer, by way of which said output signal is passed to the output of the arrangement.

An electric amplifier circuit in accordance with the present invention, and apparatus in which such an amplifier may be used, will now be described by way of example with reference to the accompanying drawings, of which:

Figure 1:
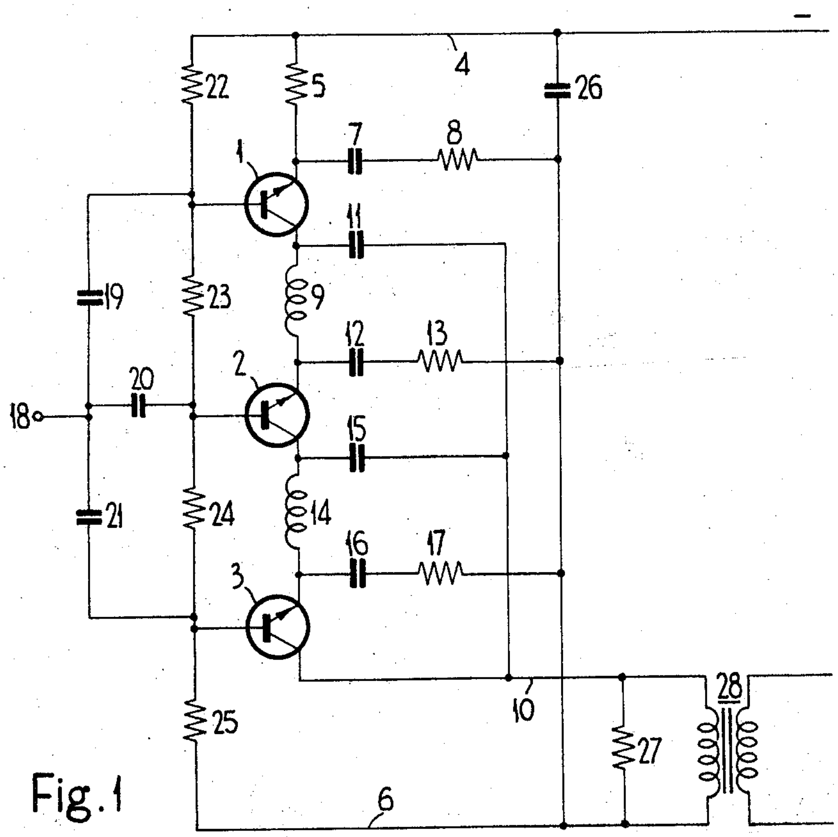
FIGURE 1 shows the amplifier circuit diagrammatically.

Referring to FIGURE 1, the amplifier includes three similar n-p-n junction transistors 1, 2 and 3. The emitter electrode of the transistor 1 is connected to the direct current negative supply line 4 by way of a resistor 5, and to the positive supply line 6 by way of a capacitor 7 and a resistor 8 connected in series. The collector electrode of the transistor 1 is connected to the emitter electrode of the transistor 2 by way of an inductor 9, and to an output line 10 by way of a capacitor 11. The emitter electrode of the transistor 2 is connected to the supply line 6 by way of a capacitor 12 and a resistor 13 connected in series. The collector electrode of the transistor 2 is connected to the emitter electrode of the transistor 3 by way of an inductor 14, and to the output line 10 by way of a capacitor 15. The emitter electrode of the transistor 3 is connected to the supply line 6 by way of a capacitor 16 and a resistor 17. The collector electrode of the transistor 3 is directly connected to the output line 10. The base electrodes of the transistors 1, 2 and 3 are connected to an input terminal 18 by way of respective capacitors 19, 20 and 21. The base electrode of the transistor 1 is also connected to the supply line 4 by way of a resistor 22 and to the base electrode of the transistor 2 by way of a resistor 23. The base electrode of the transistor 3 is connected to the base electrode of the transistor 2 by way of a resistor 24 and to the supply line 6 by way of a resistor 25. The negative supply line 4 is connected to the positive supply line 6 by way of a capacitor 26. The output line 10 is connected to the supply line 6 by way of a resistor 27. A line matching transformer 28 is connected between the output line 10 and the supply line 6.

During operation, an alternating current input signal is supplied between the input terminal 18 and the supply line 6, direct current from a constant current source (not shown in FIGURE 1) is supplied between the supply line 4 and the line 6 with the negative side on the line 4, and the amplified output signal is obtained from across the secondary winding of the transformer 28. The values of the resistors 22, 23, 24 and 25 are selected such that the emitter-collector voltages of the transistors 1, 2 and 3 are substantially the same.

The input signal applied to the input terminal 18 is passed to the base electrodes of the transistors 1, 2 and 3, by way of the capacitors 19, 20 and 21 respectively. Each of the transistors 1, 2 and 3 operates as a common emitter amplifier, and an output signal is obtained from the collector electrode of each of them. The output signals are passed to the line 10, the one from the transistor 1 by way of the power separating low pass filter comprising the inductor 9 and the capacitor 11, the one from the transistor 2 by way of a similar filter comprising the inductor 14 and the capacitor 15, and the one from the transistor 3 directly. The resultant signal on the line 10 passes to the primary winding of the transformer 28, and the output signal from the amplifier is obtained from across the secondardy winding of the transformer 28.

The resistor 27 and the transformer 28 operate together to determine the load and output impedance of the amplifier.

The capacitor 7 and the resistor 8 form the emitter signal path for the transistor 1, and similarly capacitor 12 and resistor 13, and capacitor 16 and resistor 17 form the emitter signal paths for the transistors 2 and 3 respectively, these paths also providing individual negative feedback paths for the transistors 1, 2 and 3.

Since the emitter to collector current paths of the transistors 1, 2 and 3 are connected in series between the supply line 4 and the line 6, the transistors 1, 2 and 3 have the same emitter to collector current. The emitter-collector voltages of the transistors 1, 2 and 3 are made substantially equal by selection of the values of the resistors 22, 23, 24 and 25, so that each of the transistors 1, 2 and 3 dissipates one third of the total direct current power. Also the maximum emitter-collector voltage that each of the transistors 1, 2 and 3 is required to withstand during operation of the amplifier is reduced by a factor of three compared with a single-transistor amplifier arrangement.

Although the amplifier circuit described utilises three transistors, it will be appreciated that any number greater than one may be used. However many transistors are used, they are connected with their base to collector current paths in parallel and their emitter to collector current paths in series, in similar manner to those in the embodiment described.

A plurality of complete amplifiers, each of which includes one or more transistors, may be connected so as to be in series as far as the supply of direct current to operate them is concerned, and in parallel as far as the transmission of an alternating current signal through them is concerned, thus providing an arrangement which is capable of high power working without overloading any of the transistors in the amplifiers.

Figure 2:
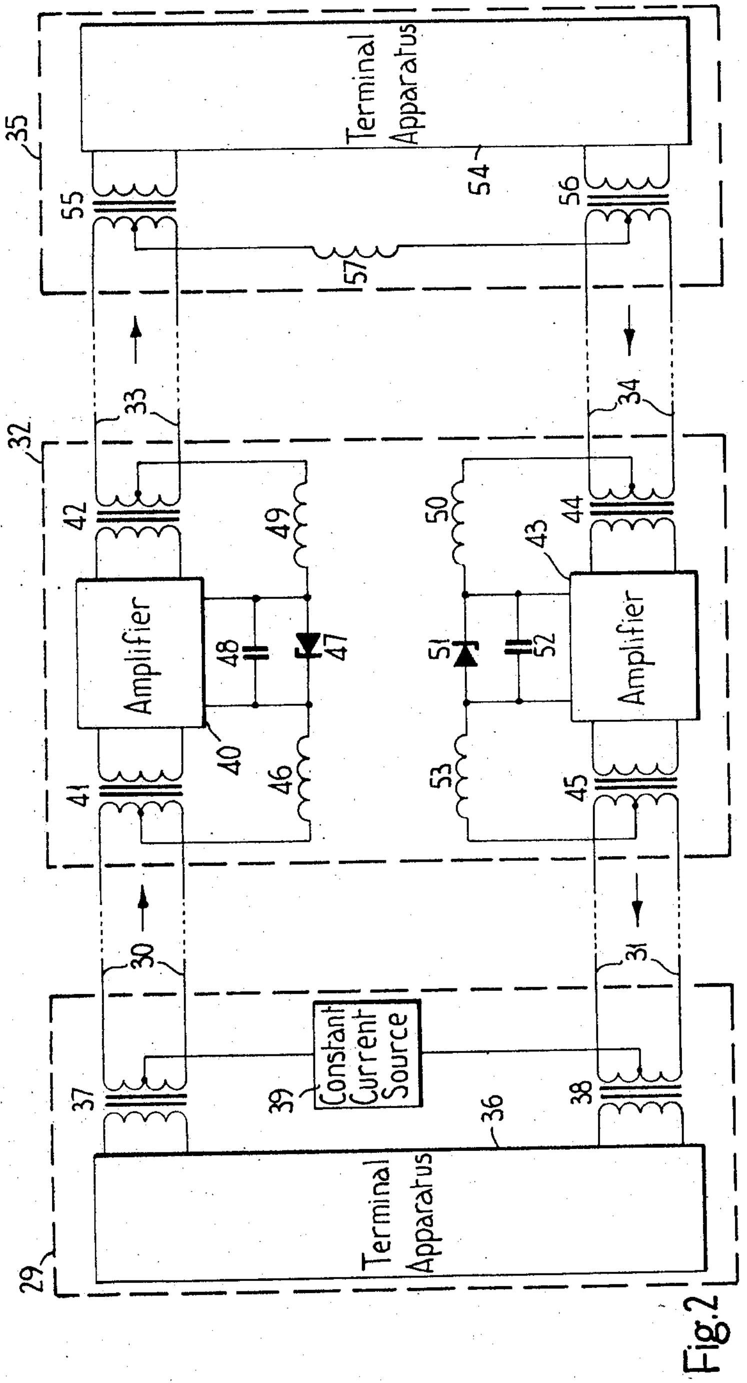
FIGURE 2 shows, partly schematically, a line communicating system of which the amplifier circuit of FIGURE 1 may form part.

Referring to FIGURE 2, the line communication system comprises a first terminal station 29 which is connected by way of two two-conductor transmission paths 30 and 31 to a repeater station 32 which, in turn, is connected by way of two further two-conductor paths 33 and 34 to a second terminal station 35.

The terminal station 29 includes terminal apparatus 36 which is arranged to transmit alternating current signals to the path 30 by way of a transformer 37 and to receive alternating current signals from the path 31 by way of a transformer 38. A constant current source 39 is connected between a tapping on the secondary winding of the transformer 37 and a tapping on the primary winding of the transformer 38.

The repeater station 32 includes an amplifier 40, which is arranged to amplify alternating current signals received from the path 30 by way of a transformer 41 and to pass the amplified signals to the path 33 by way of a transformer 42, and an amplifier 43 which is arranged to amplify signals received from the path 34, by way of a transformer 44, and to pass the amplified signals to the path 31, by way of a transformer 45. Each of the amplifiers 40 and 43 is of the type described above with reference to FIGURE 1. In the case of the amplifier 40, for example, the secondary winding of the transformer 41 may be connected between the input terminal 18 and the common line 6, the lines 4 and 6 may be connected to the respective terminals of the Zener diode 47, and the transformer 28 may be connected as the transformer 42.

A direct current connection is provided betwen a tapping on the primary winding of the transformer 41 and a tapping on the secondary winding of the transformer 42, by way of an inductor 46, a Zener diode 47 and a capacitor 48 in parallel, and an inductor 49, all in series.

A similar direct current connection is provided between a tapping on the primary winding of the transformer 44 and a tapping on the secondary winding of the transformer 45, by way of an inductor 50, a Zener diode 51 and a capacitor 52 in parallel, and an inductor 53, all in series.

The terminal station 35 comprises terminal apparatus 54 which is arranged to receive signals from the path 33 by way of a transformer 55 and to transmit signals to the path 34 by way of a transformer 56. A direct current connection is provided between a tapping on the primary winding of the transformer 55 and a tapping on the secondary winding of the transformer 56 by way of an inductor 57. This connection is shown only for the purposes of the present illustration. It will be appreciated that this connection would in practice be made at the repeater station 32 (or at one of the repeater stations if more than one are interposed between the terminal stations 29 and 35).

There is thus provided a complete loop for direct current supplied by the constant current source 39 by way of the paths 30, 33, 34 and 31 and the direct current connections referred to above, the polarity and voltage of the source 39 being such that in operation the Zener diodes 47 and 51 are conducting in the reverse direction. The voltages thus set up across the Zener diodes 47 and 51 are used to energise the respective amplifiers 40 and 43, being applied therein between lines corresponding to the lines 4 and 6 of FIGURE 1.

In order to keep to a minimum direct current resistive loss in the two-conductor paths 30, 31, 33 and 34 the source 39 provides a high voltage between the paths 30 and 31 at a low value of current. It will be appreciated that since the repeater amplifiers 40 and 43 are effectively in series as far as the direct current loop is concerned this high voltage is shared between the repeater amplifiers.

If the supply current is limited to say fifty milliamps and an alternating current output power of one watt is required for, say, the amplifier 40, then for normal conversion efficiency a voltage of approximately seventy volts will be required across the Zener diode 47. With this value of supply voltage an alternating voltage excursion of one hundred and forty volts peak to peak may be expected, so that if transistors having a maximum collector voltage of, say, forty volts are used each amplifier 40 or 43 preferably has the circuit of FIGURE 1 modified, as previously mentioned, by the addition of another transistor so that there are four transistors the emitter-collector paths of which are connected in series for direct current.

In the above example the constant current source 39 would be required to supply a current of fifty milliamps at a voltage somewhat greater than one hundred and forty volts to energise the two amplifiers 40 and 43 and to allow for resistive losses in the paths 30, 31, 33 and 34.

We claim:

1. An electric amplifier circuit comprising a plurality of similar transistors each having a control electrode and first and second further electrodes and a first-to-second further electrode current path, at least one element having high alternating current impedance and low direct current impedance, means connecting said first-to-second further electrode current paths of all said transistors to form a series path for direct current with one of said elements connected in said path between each adjacent pair of said transistors, a plurality of first alternating current paths respectively connecting the control electrodes of said transistors to a common input point, a plurality of further alternating current paths respectively connecting the first further electrodes of said transistors to a point of reference potential, and a plurality of output current paths respectively connecting the second further electrodes to a common output point, the circuit being arranged such that output alternating currents flowing in the first-to-second further electrode path of any one of said transistors are passed to the common output point substantially without passing through the first-to-second further electrode paths of any of the other transistors.

2. An electric amplifier circuit in accordance with claim 1 wherein the transistors are junction transistors each having base, emitter and collector electrodes, the control electrodes being the base electrodes and the first and second further electrodes being the emitter and collector electrodes respectively.

3. An electric amplifier in accordance with claim 1 wherein said further alternating current paths include series resistors for the purpose of providing negative feedback.

4. In a line communication system which includes two terminal stations and one or more repeater stations, and in which direct current for energizing the repeater station apparatus of the system is supplied from one of the terminal stations of the system by way of the line, said repeater station apparatus including amplifier means, means to receive an alternating current signal from the line and to apply said signal to the amplifier means, means to derive a direct current voltage from the line, and means to apply said direct current voltage to energize said amplifier means, said amplifier means comprising a plurality of similar transistors each having a control electrode and first and second further electrodes and a first-to-second further electrode current path, at least one element having high alternating current impedance and low direct current impedance, means connecting said first-to-second further electrode current paths of all said transistors to form a series path for direct current with one of said elements connected in said path between each adjacent pair of said transistors, a plurality of first alternating current paths respectively connecting the control electrodes of said transistors to a common input point, a plurality of further alternating current paths respectively connecting the first further electrodes of said transistors to a point of reference potential, and a plurality of output current paths respectively connecting the second further electrodes to a common output point, the amplifier means being arranged such that output alternating currents flowing in the first-to-second further electrode path of any one of said transistors are passed to the common output point substantially without passing through the first-to-second further electrode paths of any of the other transistors.

5. A system in accordance with claim 4 wherein the transistors are junction transistors each having base, emitter and collector electrodes, said control electrode being the base electrode and said first and second further electrodes being the emitter and collector electrodes respectively.

6. A system in accordance with claim 4 wherein said further alternating current paths include series resistors for the purpose of providing negative feedback.

References Cited

UNITED STATES PATENTS

| | | | |
|---|---|---|---|
| 3,268,826 | 8/1966 | Harrison et al. | 330—18 XR |
| 3,274,505 | 9/1966 | Frisch et al. | 330—18 |

KATHLEEN H. CLAFFY, *Primary Examiner.*

R. LINN, *Assistant Examiner.*

U.S. Cl. X.R.

330—18, 30